United States Patent [19]

Kronenberg et al.

[11] Patent Number: 4,489,240
[45] Date of Patent: Dec. 18, 1984

[54] RADIOCHROMIC LEUKO DYE REAL TIME DOSIMETER, ONE WAY OPTICAL WAVEGUIDE

[76] Inventors: Stanley Kronenberg, Hollow Rd., Skillman, N.J. 08558; William L. McLaughlin, 3901 Albemeale St. NW., Washington, D.C. 20016; Carl R. Siebentritt, 1045 Brook Valley La., McLean, Va. 22101

[21] Appl. No.: 441,718

[22] Filed: Nov. 15, 1982

[51] Int. Cl.³ ............................................... G01T 1/00
[52] U.S. Cl. ............................. 250/474.1; 250/472.1
[58] Field of Search ............... 250/472.1, 474.1, 473.1

[56] References Cited

U.S. PATENT DOCUMENTS 4,377,751 3/1983 Kronenberg et al. ............ 250/474.1
4,385,237 5/1983 Drukaroff et al. ................ 250/474.1

OTHER PUBLICATIONS

Fiber Optics Dosimetry by Stanley Kronenberg and Carl R. Siebentritt, Nuclear Instruments and Methods, vol. 175, No. 1, Sep. 1, 1980, pp. 109–111.

Primary Examiner—Alfred E. Smith
Assistant Examiner—Carolyn E. Fields
Attorney, Agent, or Firm—Anthony T. Lane; Jeremiah G. Murray; Roy E. Gordon

[57] ABSTRACT

A radiochromic leuko dye dosimeter includes a plastic tube containing a solution of a radiochromic dye which is sensitive to ionizing radiation, one end of the tube being closed by a reflective surface, the opposite end of the tube being closed by a transparent plug to form a one-way optical waveguide. Light enters the tube through the transparent end thereof and is reflected back and exits through the transparent end. The intensity of the exiting light is measured to determine radiation induced absorption of the leuko dye.

9 Claims, 4 Drawing Figures

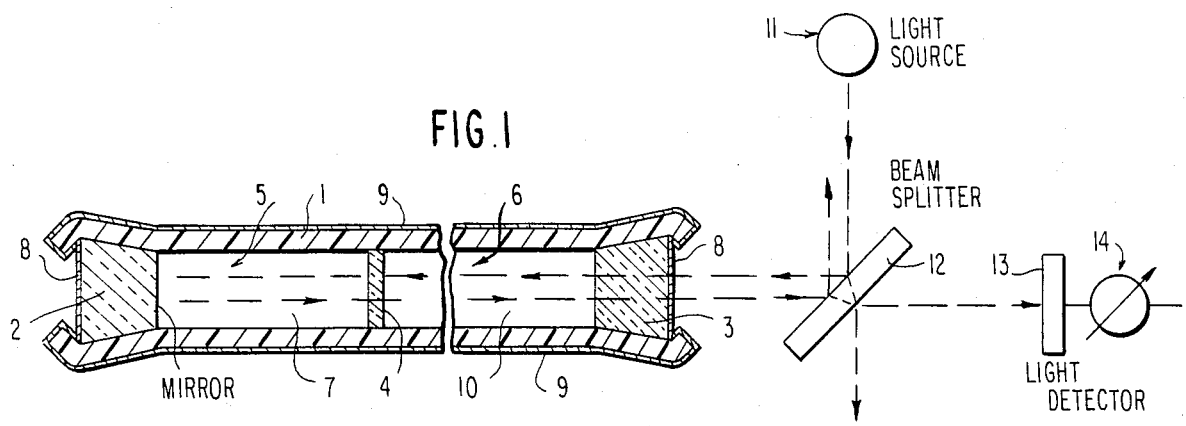
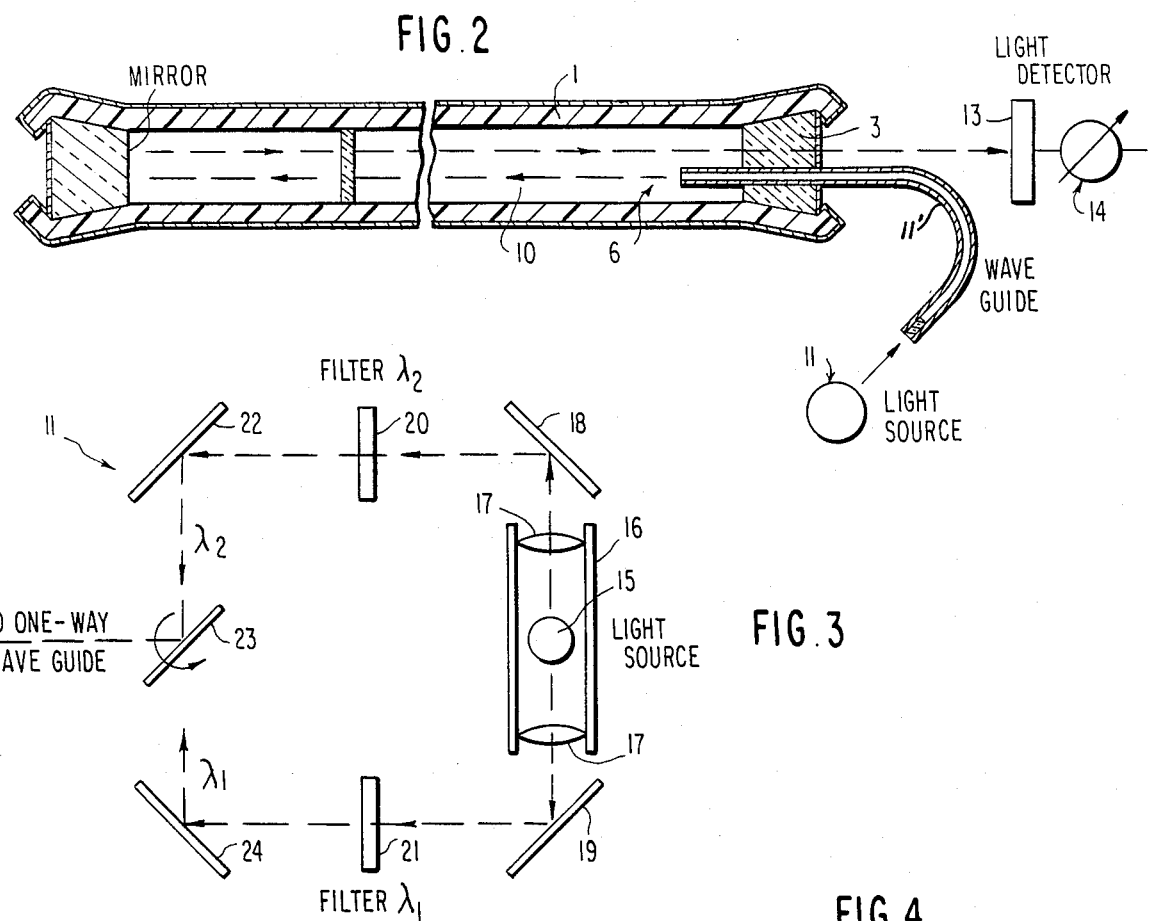
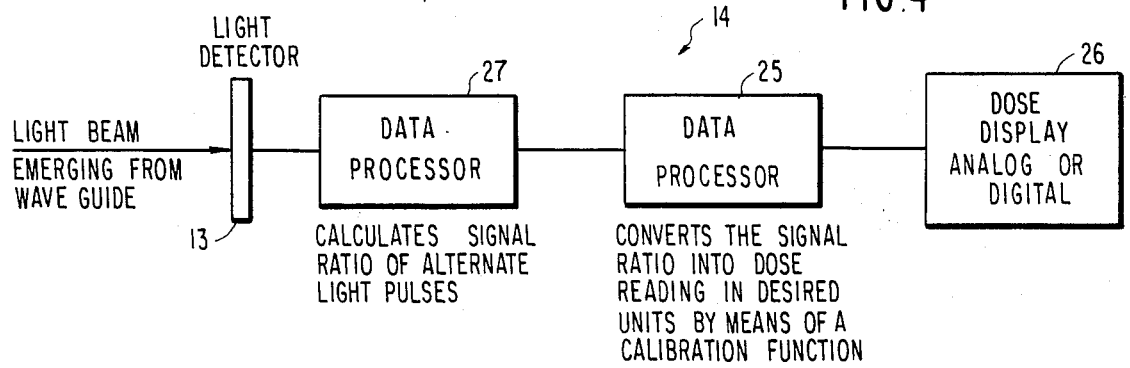

4,489,240

RADIOCHROMIC LEUKO DYE REAL TIME DOSIMETER, ONE WAY OPTICAL WAVEGUIDE

The invention described herein may be manufactured, used, and licensed by or for the Government for Governmental purposes without the payment to me of any royalties thereon.

BACKGROUND OF THE INVENTION

This invention relates generally to nuclear radiation dosimetry, and more particularly to a radiochromic leuko dye dosimeter constructed and arranged to measure absorbed radiation doses, such as gamma rays, X-rays and fast neutrons, in real time; viz., as the dose is being delivered.

The dosimeter of the present invention comprises, essentially, a plastic tube having a reflective surface closing one end thereof and a transparent plug closing the opposite end thereof. A transversely extending transparent partition is mounted within the tube dividing the tube into a pair of chambers, the chamber between one side of the partition and the reflective surface containing a radiochromic dye which is sensitive to ionizing radiation. The other chamber, between the opposite side of the partition and the transparent plug contains a clear pure solvent invulnerable to radiation. Light enters the tube through the transparent end thereof and is reflected back and exits through the transparent end, whereby the intensity of the exiting light is measured to determine radiation induced absorption of the leuko dye.

The dosimeter of the present invention can be used to measure doses remotely, as the dose is being delivered, and thus is readily adaptable for use in medicine during radiation therapy, nuclear radiation research, monitoring of nuclear radiation and radiation safety.

BRIEF DESCRIPTION OF THE DRAWINGS

FIG. 1 is a sectional side elevational view of the dosimeter of the present invention, diagrammatically illustrating one method of injecting light therein, and detecting the intensity of the light exiting therefrom;

FIG. 2 is a view similar to FIG. 1 but illustrating another method of injecting light into the dosimeter;

FIG. 3 is a diagrammatic view of the light source shown in FIGS. 1 and 2; and

FIG. 4 is a diagrammatic view of the instrumentation employed in FIGS. 1 and 2 for measuring and indicating the intensity of the exiting light.

DETAILED DESCRIPTION OF THE INVENTION

Referring to the drawings and more particularly to FIG. 1 thereof, the dosimeter of the present invention comprises a thin capillary tube 1 of plastic, such as a Teflon-like flexible thermoplastic having a refractive index of 1.34. The tube 1 shown in the drawings is enlarged for sake of clarity but in actual practice, the tube may have a 3.0 mm outer diameter and a 2.3 mm inner diameter, or even a 0.8 mm outer diameter and a 0.25 mm inner diameter. One end of the tube is closed by a reflective member 2, such as a mirror, and the opposite end of the tube is closed by a transparent plug 3. A transversely extending transparent partition 4 is mounted within the tube and divides the tubing into a pair of chambers 5 and 6. Chamber 5, which is relatively short in length compared to that of chamber 6, is filled with a solution of radiochromic leuko dye 7 which changes color upon exposure to ionizing radiation. The particular dye employed is a 5–20% solution of hexahydroxyethyl pararosanile cyanide, in a solvent of either dimethyl sulfoxide, triethyl phosphate or N,N-dimethyl formamide.

Since the dye is sensitive to ultraviolet light, a layer 8 of clear ultraviolet absorbing varnish is coated on the exterior surfaces of the mirror 2 and transparent plug 8, and an opaque outer layer 9 is provided on the tube 1.

The solvents employed insure stability; that is, no fading of the radiation-induced color change in the dye, and have indices of refraction from 1.41 to 1.48 which are greater than the refractive index of the tube wall. The solution of radiochromic leuko dye thereby forms a core within the tube 1 resulting in a total reflection of light travelling through the core, thus satisfying the waveguide condition.

The chamber 6 is filled with one of the above-noted solvents 10, such as triethyl phosphate, which is pure; that is, it does not contain any radiochromic dye; accordingly, it is invulnerable to radiation.

A suitable light source 11, to be described more fully hereinafter, is provided for injecting visible light into the tube 1 and, as shown in FIG. 1, a beam splitter 12 is employed for reflecting the light ray into the tube through the transparent plug 3, the light being reflected from the mirror 2, whereupon it exits through the transparent plug 3, through the beam splitter 12 to a suitable light detector 13 such as a photo-cell, the output of which is connected to suitable instrumentation 14 for measuring and indicating the intensity of the exiting light which is converted to dose readings.

While the beam splitter 12 is employed for directing the light into the tube 1, as shown in FIG. 1, FIG. 2 illustrates an alternate manner, wherein a small diameter waveguide 11', such as an optical fiber, is employed, the fiber extending through the transparent plug 3 into the chamber 6 containing the pure solvent 10.

In order to determine the absorbed dose, measurements at two different wavelengths must be made. The details of the construction of the light source 11 for providing the different wavelengths are shown in FIG. 3. A source of white light 15, such as a halogen lamp, is mounted in a housing 16 having lenses 17 at each end thereof. The light emerging from each end of the housing 16 is reflected by suitable mirrors 18 and 19, through light filters 20 and 21. Light having a wavelength $\lambda_2$ passes through filter 20 and is reflected by a mirror 22 to a rotating mirror 23 from which it is reflected into the waveguide formed by the tube 1. Similarly, light having a wavelength $\lambda_1$ passes through filter 21 and is reflected by mirror 24 to the rotating mirror 23. By this construction and arrangement, the light being injected into the waveguide tube 1 and exiting therefrom consists of light pulses at two alternating wavelengths.

The instrumentation 14 for measuring the intensity of the exiting light from the tube 1 to determine radiation induced absorption of the leuko dye is illustrated in FIG. 4, wherein a data processor 27 receives a signal from the light detector and calculates the ratios of transmitted intensities before and after exposure at two different wavelengths. A second data processor 25 receives the ratio signal from data processor 27 and converts the signal into a dose reading in desired units by means of a calibrating function, the dose reading being visible on a display 26 which may be either analog or digital.

From the above description, it will be appreciated by those skilled in the art that the dosimeter of the present invention is readily adaptable for use in the field of medicine, particularly radiation therapy, wherein the radiation sensitive, leuko dye containing section 7 of the waveguide 1 is placed at the point where the dose measurement is to be performed, such as the colon, urinary tract, uterus, stomach and other organs. The inactive portion 10 of the waveguide extends outside the patient and communicates with the dose instrumentation 14, which records and displays the dose while it is being delivered. Several independent dosimeters can be used simultaneously to monitor the dosage in several parts of the body.

Radiochromic waveguide dosimetry measuring doses in real time is also of particular interest for nuclear weapon testing in cases where recovery of the dosimeter cannot take place and where the shockwave destroys the dosimeter very soon after time zero. In this application, a glass fiber optics transmission line would be connected to the transparent plug 3 outside the radiation area and would be used to transmit the signal to the instrumentation 14 at a control point.

Having thus shown and described what is at present considered to be the preferred method of fabrication and the resulting structure thereof, it should be noted that the foregoing has been made by way of illustration and not limitation and accordingly all modifications, alterations and changes coming within the spirit and scope of the invention as set forth in the appended claims are herein meant to be included.

We claim:

1. A radiochromic leuko dye dosimeter comprising a tube, a reflective member closing one end of said tube, a transparent member closing the other end of said tube, a solution of a radiochromic dye which changes color upon exposure to ionizing radiation contained within said tube, said solution of radiochromic dye having an index of refraction greater than the refracfive index of said tube wall to thereby form a waveguide, a transversely extending partition mounted in said tube and dividing the tube into a pair of chambers, one chamber being disposed between the reflective member and one side of said partition, and the other chamber being disposed between the transparent member and the opposite side of said partition, said solution of radiochromic dye being contained in said one chamber, and a solvent invulnerable to radiation being contained in the other chamber, light means for directing light rays into the transparent end of said tube, said light rays being reflected by said reflective member and exiting through said transparent end, and instrumentation means for detecting the exiting light rays and measuring and indicating the intensity of the exiting light as a function of the nuclear radiation dose being delivered in the vicinity of the tube.

2. A radiochromic leuko dye dosimeter according to claim 1, wherein the tube comprises a thin, capillary, flexible, plastic tube.

3. A radiochromic leuko dye dosimeter according to claim 2, wherein a clear ultraviolet absorbing varnish is coated on the exterior surfaces of the reflective member and the transparent member, and an opaque layer is provided on the outer surface of the tube to thereby render the dye insensitive to ambient ultraviolet light.

4. A radiochromic leuko dye dosimeter according to claim 1, wherein the solution of radiochromic dye comprises a 5–20% solution of hexahydroxyethyl pararosanile cyanide, in a solvent of either dimethyl sulfoxide, triethyl phosphate or N,N-dimethyl formamide.

5. A radiochromic leuko dye dosimeter according to claim 1, wherein said light means directed into said tube consists of light pulses at two alternating wavelengths.

6. A radiochromic leuko dye dosimeter according to claim 5, wherein a beam splitter is interposed between the light means and the transparent end of said tube for directing the light pulses into said tube and for, directing the light emerging from the tube into said means for detecting the exiting light.

7. A radiochromic leuko dye dosimeter according to claim 5, wherein an optical fiber waveguide is interposed between the light means and the transparent end of said tube for directing the light pulses into said tube while the transparent end transmits the light to said means for detecting the exiting light.

8. A radiochromic leuko dye dosimeter according to claim 5, wherein said light means comprises, a housing, a source of white light mounted within said housing, said housing being opened at each end thereof, a pair of light filters, one filter being positioned to receive the light rays exiting from one end of said light housing, and the other filter being positioned to receive the light rays exiting from the other end of said light housing, and a rotating mirror positioned to receive light having a wavelength $\lambda_2$ from said one filter and light having a wavelength $\lambda_1$ from said other filter, said rotating mirror reflecting the filtered light alternately into the tube.

9. A radiochromic leuko dye dosimeter according to claim 8, wherein the instrumentation means comprises, a light detector means for receiving the reflected light from the tube, a first data processor means for receiving a signal from the light detector and calculating the ratios of transmitted light intensities before and after radiation exposure at two different wavelengths, a second data processor means for receiving the ratio signal from said first data processor and converting the signal into a dose reading in desired units by means of a calibrating function, and a display connected to said second data processor for visibly displaying the radiation dose being delivered.

* * * * *